United States Patent
Miyamoto

(10) Patent No.: US 9,336,221 B2
(45) Date of Patent: May 10, 2016

(54) IMAGE PROCESSING SYSTEM, IMAGE PROCESSING APPARATUS, IMAGE PROCESSING METHOD, AND STORAGE MEDIUM, THAT ARE CAPABLE OF DISPLAYING A LIST OF FOLDERS

(71) Applicant: CANON KABUSHIKI KAISHA, Tokyo (JP)

(72) Inventor: Daijiro Miyamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/488,066

(22) Filed: Sep. 16, 2014

(65) Prior Publication Data

US 2015/0077814 A1    Mar. 19, 2015

(30) Foreign Application Priority Data

Sep. 18, 2013   (JP) ................. 2013-193035

(51) Int. Cl.
*G06F 17/30* (2006.01)

(52) U.S. Cl.
CPC ................. *G06F 17/30126* (2013.01)

(58) Field of Classification Search
CPC .............. G06F 17/30; G06F 12/30002; G06F 17/30126; G06F 17/30011
USPC ......... 358/1.15, 402, 403, 405; 715/825, 829; 399/81
See application file for complete search history.

(56) References Cited

U.S. PATENT DOCUMENTS

2009/0006422 A1*  1/2009  Matsuzawa et al. ............ 707/10
2012/0330947 A1* 12/2012  Huenemann ...... G06F 17/30864
                                                            707/728

FOREIGN PATENT DOCUMENTS

JP      2008-072256 A      3/2008

* cited by examiner

*Primary Examiner* — Jamares Q Washington
(74) *Attorney, Agent, or Firm* — Canon U.S.A., Inc. IP Division

(57) ABSTRACT

An MFP displays a screen including a list of a part of a plurality of folders and an index key. When the index key is operated, the screen is updated so that a folder having a name starting from a first character from among the plurality of folders is displayed. When the same index key is operated again, the screen is updated so that a folder having a name starting from a second character subsequent to the first folder from among the plurality of folders is displayed. Image data generated by reading an image on a document is stored in a selected folder.

11 Claims, 16 Drawing Sheets

APPLICATION TOP SCREEN 610

STUDENT LIST SCREEN 620

FIG. 11

FOLDER LIST 1100

| 1 | Aaron Smith |
|---|---|
| 2 | Abigail Johnson |
| 3 | Andrea Wilson |
| 4 | Andrew Davis |
| 5 | Bentley Taylor |
| 6 | Brody Martin |
| 7 | Brooklyn Lewis |
| 8 | Caroline Walker |
| 9 | Connor Perez |
| 10 | Chloe Hall |
| 11 | David Sanchez |
| 12 | Ethan Adams |
| 13 | Hudson Roberts |
| 14 | Ian Phillips |
| 15 | Makayla Howard |
| 16 | Nathan Reyes |
| 17 | Robert Ross |
| 18 | Sofia Morales |
| 19 | Trinity Gutierrez |
| 20 | Tristan Jenkins |

IMAGE PROCESSING SYSTEM, IMAGE PROCESSING APPARATUS, IMAGE PROCESSING METHOD, AND STORAGE MEDIUM, THAT ARE CAPABLE OF DISPLAYING A LIST OF FOLDERS

BACKGROUND

1. Field

Aspects of the present invention are generally related to an image processing system, an image processing apparatus, an image processing method, and a storage medium that are capable of displaying a list of folders.

2. Description of the Related Art

Conventionally, scanner apparatuses that read an image on a document and generate image data have been known. The image data generated by the scanner apparatus can be transmitted to an external apparatus (e.g., a personal computer (PC) or a file server) on a network, to be stored in a folder generated in the external apparatus. When a folder is generated in the scanner apparatus, the image data may be stored in the folder of the scanner apparatus.

The following known technique can be used for designating a folder as a storage destination of the image data. Specifically, information on folders managed on a side of the external apparatus or in the scanner apparatus is acquired, and a folder list is displayed on a display unit (Japanese Patent Application Laid-Open No. 2008-072256). Based on the folder list displayed on the display unit, a user of the scanner apparatus can designate an arbitrary folder as the storage destination of the image data.

When there are a large number of folders as possible storage destinations of the image data, all of the folders might not be able to be displayed at once due to limitation in the screen size. In such a case, to select a desired folder, the user has to perform a cumbersome operation of scrolling a screen where only a part of the folders are displayed at once, until the desired folder is displayed.

To address such an issue, index keys which are respectively allocated predetermined characters may be displayed on the screen. In response to an index key being operated, a folder having a name starting from the corresponding one of the predetermined characters is displayed. As a result, the user can swiftly reach the desired folder, and thus higher usability can be achieved. However, when one index key is provided for each character, the same number of the index keys as the number of characters need to be displayed, and thus a screen area is largely occupied.

SUMMARY

Aspects of the present invention are generally directed to an image processing system that can achieve both higher operability in selection of a folder and efficient use of a screen area.

According to an aspect of the present invention, an image processing system includes a management unit configured to manage a plurality of folders, a reading unit configured to read an image on a document to generate image data, a display unit configured to display a screen including a list of a part of the plurality of folders and an index key, a screen update unit configured to, when the index key is operated, update the screen so that a folder having a name starting from a first character among the plurality of folders is displayed, and when the index key is operated again, update the screen so that a folder having a name starting from a second character subsequent to the first folder among the plurality of folders is displayed, and a storage unit configured to store the image data generated by the reading unit in a folder selected by a user from among folders displayed on the screen by the display unit.

Further features of the present disclosure will become apparent from the following description of exemplary embodiments with reference to the attached drawings.

BRIEF DESCRIPTION OF THE DRAWINGS

FIG. 11 is a diagram illustrating a folder list according to an exemplary embodiment.

DESCRIPTION OF THE EMBODIMENTS

Various exemplary embodiments will be described in detail below with reference to the drawings. The following exemplary embodiments are not to be construed as limiting the scope of the claims, and not all combinations of the features described in the following exemplary embodiments are required for solving the above issues.

Figure 1:
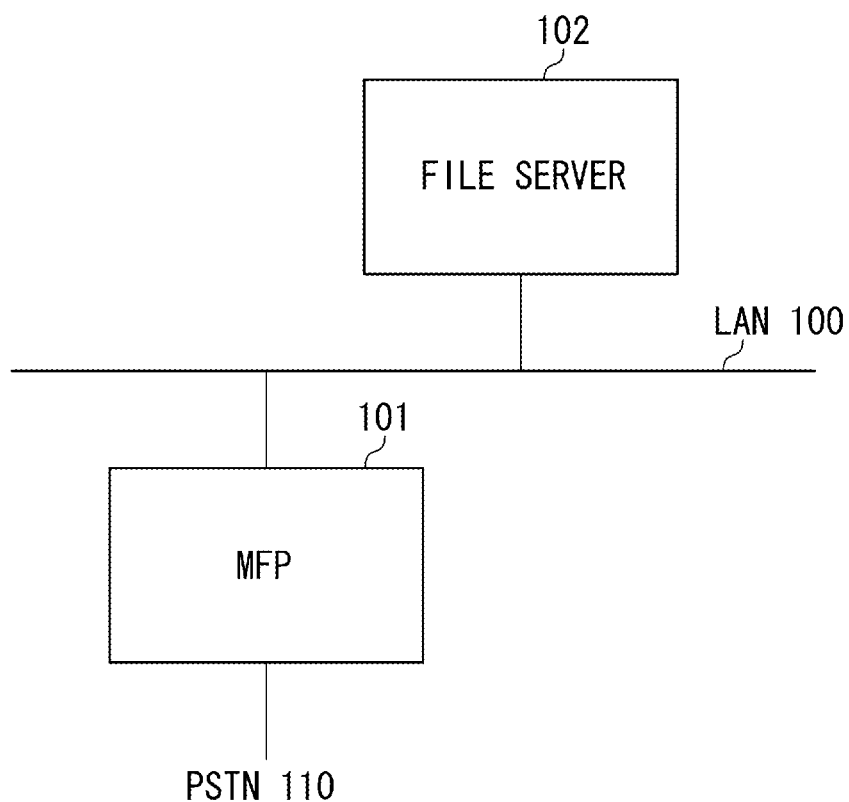
FIG. 1 is an overall view of an image processing system according to an exemplary embodiment.

A first exemplary embodiment will be described. FIG. 1 is an overall view of an image processing system. An MFP 101 and a file server 102 are communicably connected with each other on a network (local area network (LAN)) 100. The MFP 101 is an example of an image processing apparatus. Although the MFP is described herein as an example of the image processing apparatus, an apparatus other than the MFP may also be employed as the image processing apparatus so long as the apparatus has a scanner function. Furthermore, the image processing apparatus may also be a PC or a mobile terminal that are capable of communicating with a scanner apparatus.

The file server 102 is an example of an external apparatus. In the present exemplary embodiment, the image processing system refers to an overall configuration including the MFP 101 and the file server 102. Alternatively, the image processing system may represent the MFP 101 alone. The MFP 101 is connected to a public switched telephone network (PSTN) 110, and can perform facsimile communication to communicate image data with a facsimile apparatus (not illustrated).

Figure 2:
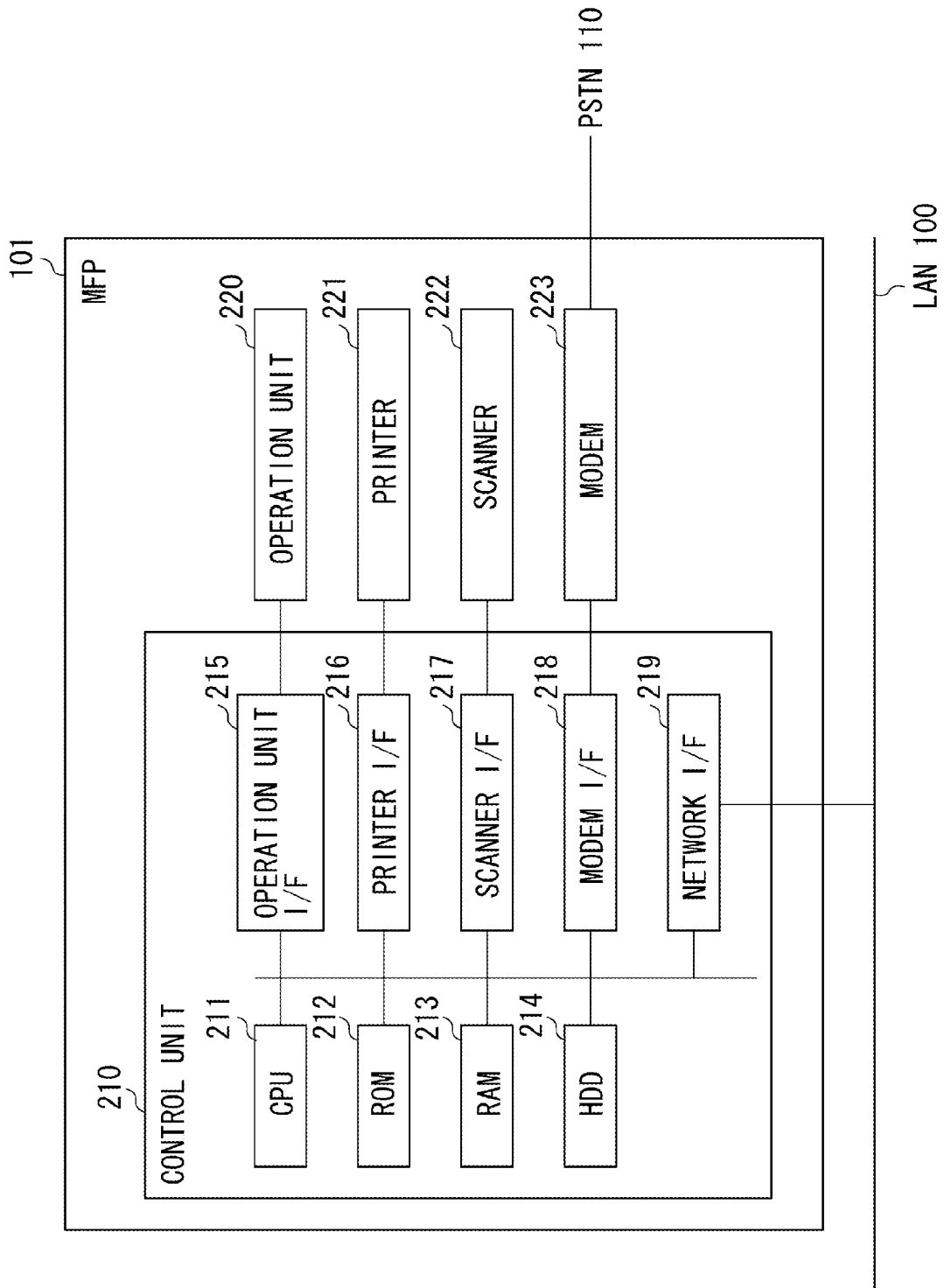
FIG. 2 is a hardware configuration diagram of a multifunction peripheral (MFP) according to an exemplary embodiment.

FIG. 2 is a hardware configuration diagram of the MFP 101. A control unit 210 including a central processing unit (CPU) 211 controls an entire operation of the MFP 101. The CPU 211 reads a control program stored in a read only memory (ROM) 212 to control various operations such as reading, printing, and communicating. A random access memory (RAM) 213 is used as a temporary storage area such as a main memory or a work area of the CPU 211. In the present exemplary embodiment, a single CPU 211 of the MFP 101 uses a single memory (the RAM 213 or a hard disk drive (HDD) 214) to perform each operation illustrated in the flowcharts described below. Alternatively, another configuration may be employed. For example, each operation in the flowcharts may be performed through cooperation between a plurality of CPUs and a plurality of RAMs or HDDs.

The HDD 214 stores image data and various programs. An operation unit interface (I/F) 215 connects an operation unit 220 and the control unit 210. The operation unit 220 includes a liquid crystal display unit having a touch panel function, a keyboard, and the like, and thus serves as a reception unit that receives operations performed by a user, and receives inputs and instructions from the user.

A printer I/F 216 connects a printer 221 and the control unit 210. Image data to be printed by the printer 221 is transmitted from the control unit 210 to the printer 221 via the printer I/F 216, so that the image data is printed on a recording medium by the printer 221.

A scanner I/F 217 connects a scanner 222 and the control unit 210. The scanner 222 reads an image on a document to generate image data, and inputs the image data to the control unit 210 via the scanner I/F 217. The MFP 101 can transmit the image data generated by the scanner 222 to the file server 102, using a web-based distributed authoring and versioning (WebDAV) protocol. Instead of WebDAV, a file transfer protocol (FTP) or a server message block (SMB) may be used.

A modem I/F 218 connects a modem 223 and the control unit 210. The modem 223 performs facsimile communication to communicate image data with a facsimile apparatus (not illustrated). A network I/F 219 connects the control unit 210 (MFP 101) and the LAN 100. Via the network I/F 219, the MFP 101 transmits image data and information to an external apparatus (such as the file server 102) on the LAN 100, and receives various types of information from the external apparatus.

Figure 3:
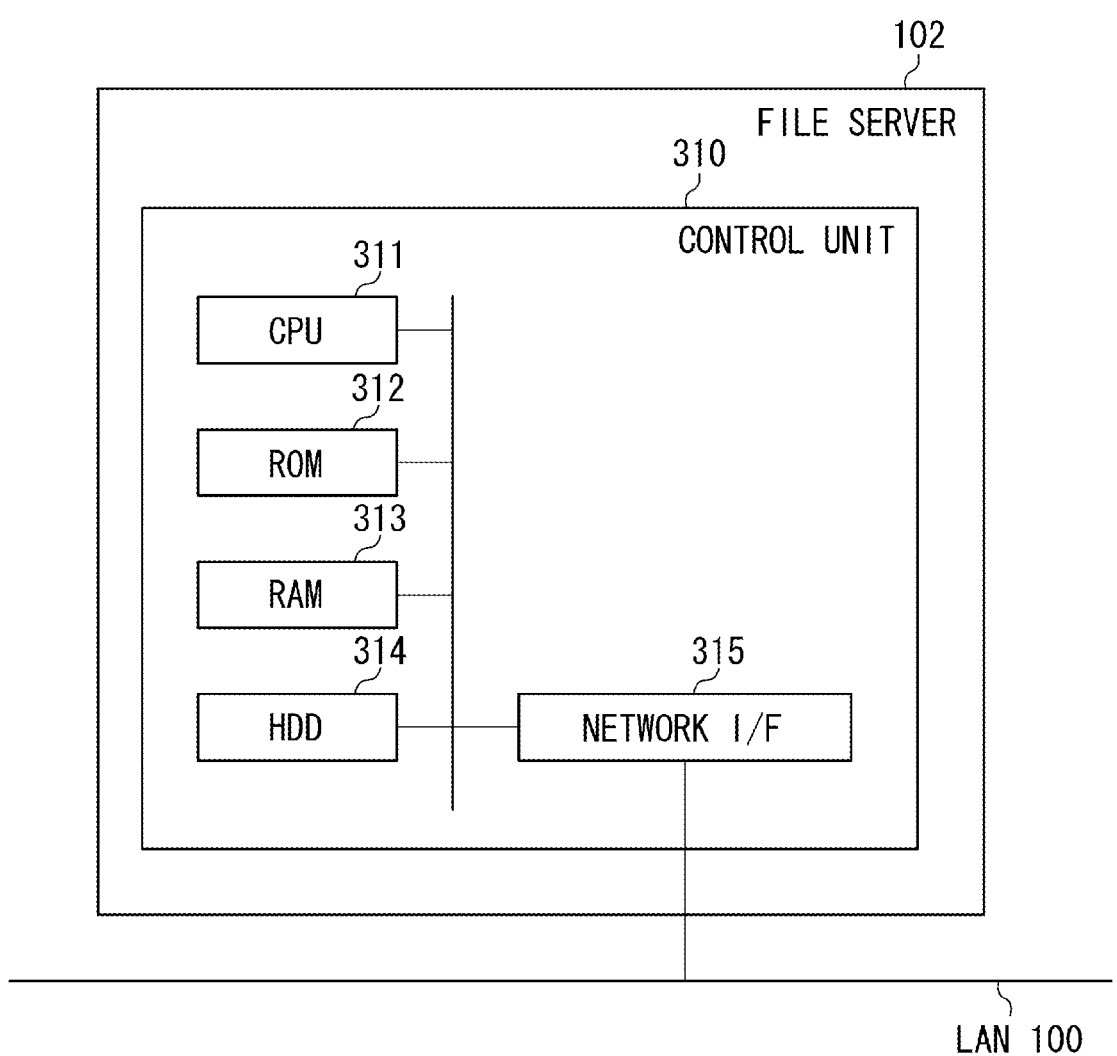
FIG. 3 is a hardware configuration diagram of a file server according to an exemplary embodiment.

FIG. 3 is a hardware configuration diagram of the file server 102. A control unit 310 including a CPU 311 controls an entire operation of the file server 102. The CPU 311 reads a control program stored in a ROM 312 to perform various types of control processing. A RAM 313 is used as a temporary storage area such as a main memory or a work area of the CPU 311. An HDD 314 stores image data and various programs. In the HDD 314, a plurality of folders managed by hierarchies is prepared. The image data transmitted from the MFP 101 can be stored in the folder. The image data stored in the folder can be viewed and operated from a PC (not illustrated) on the LAN 100.

A network I/F 315 connects the control unit 310 (file server 102) and the LAN 100. Via the network I/F 315, the file server 102 transmits and receives various types of information to and from another apparatus on the LAN 100.

Next, an operation of the image processing system (a service provided by using the image processing system) will be described with a tutoring school support system as an example. The tutoring school support system is a system for improving the efficiency of the work in tutoring schools where a large amount of documents printed on paper sheets are dealt with. The tutoring school support system facilitates, especially, an operation of reading the above-described documents by a scanner, and uploading the resultant data to a file server. The tutoring school support system is implemented by using an application named "tutoring school filing" installed on the side of the MFP 101, and a file system, on the side of the file server 102, which manages the folders by hierarchies.

Figure 4:
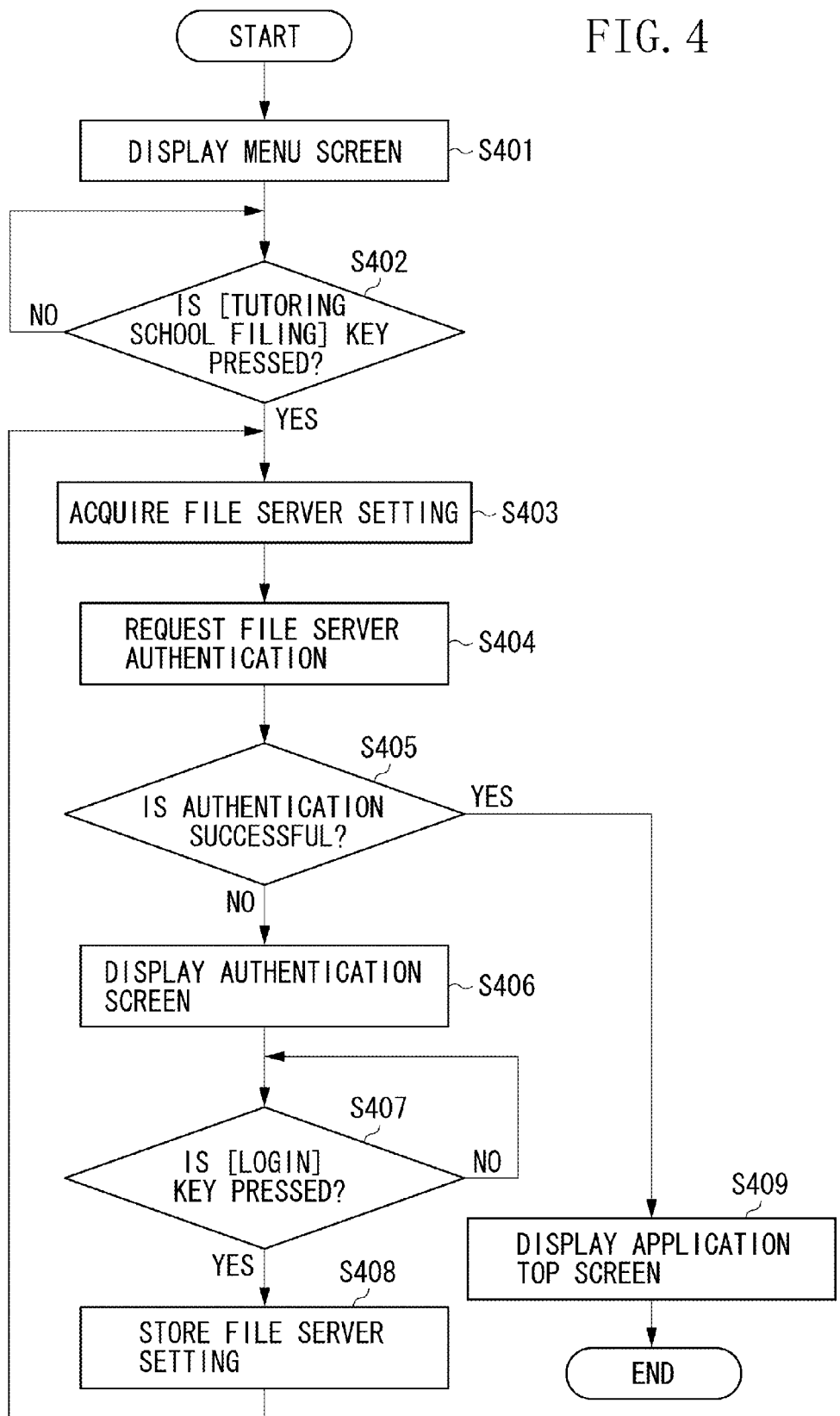
FIG. 4 is a flowchart illustrating processing performed by the MFP according to an exemplary embodiment.

FIG. 4 is a flowchart illustrating processing performed by the MFP 101 from when the MFP 101 starts up to when the MFP 101 displays an application top screen 610, which will be described below, of the "tutoring school filing". Each operation (step) illustrated in the flowchart of FIG. 4 is performed by the CPU 211 of the MFP 101 executing a control program stored in the HDD 214.

Figure 5A:
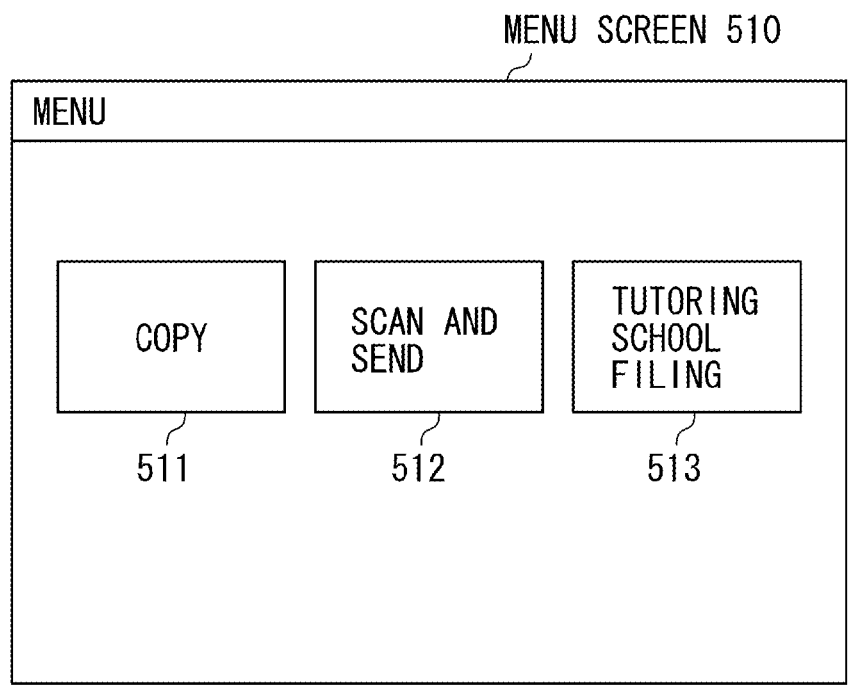
FIGS. 5A and 5B are diagrams illustrating operation screens of the MFP according to an exemplary embodiment.

In step S401, the CPU 211 displays a menu screen 510 illustrated in FIG. 5A on the operation unit 220. A list of functions and applications of the MFP 101 is displayed on the menu screen 510. A [COPY] key 511 and a [SCAN AND SEND] key 512 illustrated in FIG. 5A are operation keys corresponding to standard functions (native functions) of the MFP 101. Meanwhile, a [TUTORING SCHOOL FILING] key 513 is an operation key corresponding to a Java (registered trademark) based application additionally installed in the MFP 101. The MFP 101 may include other native functions (not illustrated) and other applications (not illustrated).

In step S402, the CPU 211 determines whether the [TUTORING SCHOOL FILING] key 513 is pressed. If the [TUTORING SCHOOL FILING] key 513 is pressed, the processing proceeds to step S403 whereas if the [TUTORING SCHOOL FILING] key 513 is not pressed, the CPU 211 stays in step S402 until the [TUTORING SCHOOL FILING] key 513 is pressed. When the [COPY] key 511 or the [SCAN AND SEND] key 512 is pressed, the corresponding function is implemented.

In step S403, the CPU 211 acquires a file server setting stored in the HDD 214. The file server setting is a comma separated value (CSV) or an extensible markup language (XML) format file including information related to the file server 102. The file server setting includes information on a host name of the file server 102 and a root folder as a starting point of a folder path. The file server setting further includes authentication information (such as identification (ID) and a password) for logging into the file server 102. The information included in the file server setting needs to be input by an administrator or a user of the MFP 101 in advance, via a file server setting screen displayed on a PC (not illustrated).

In step S404, the CPU 211 requests authentication from the file server 102, based on the file server setting acquired in step S403. When the MFP 101 is successfully authenticated, the MFP 101 can access the file server 102. In step S405, the CPU 211 determines whether the MFP 101 has successfully authenticated by the file server 102 and logged thereinto. The processing proceeds to step S409 when the authentication is successful, or proceeds to step S406 when the authentication has failed.

Figure 5B:
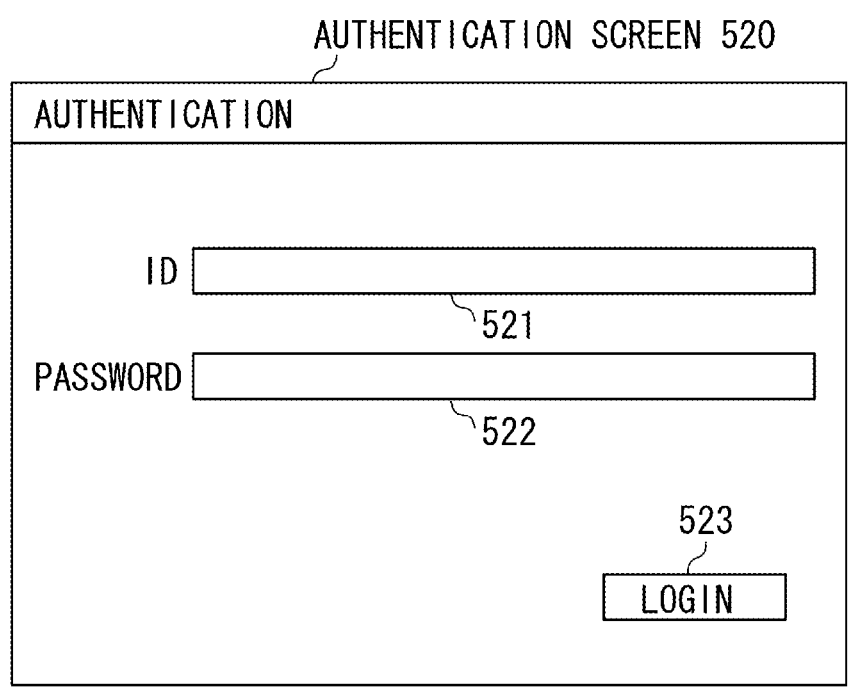

In step S406, the CPU 211 displays an authentication screen 520 illustrated in FIG. 5B on the operation unit 220. The failure of the authentication by the file server 102 indicates that the authentication information included in the file server setting might be incorrect. Thus, the user is prompted to input authentication information via the authentication screen 520. In step S407, the CPU 211 determines whether a [LOGIN] key 523 is pressed. If the [LOGIN] key 523 is pressed, the processing proceeds to step S408 whereas if the [LOGIN] key 523 is not pressed, the CPU 211 stays in step S407 until the [LOGIN] key 523 is pressed.

In step S408, the CPU 211 stores the authentication information input by the user in the HDD 214, and the processing returns to step S403. Once the operation in step S408 is performed, the user needs not to input the authentication information for the future login, but the processing may proceed to step S404 with the operations in steps S408 and S403 being omitted. Alternatively, the processing may proceed to step S404 with the operations in steps S408 and S403 being omitted, and then the authentication information may be stored after the CPU 211 determines that the authentication is successful in step S405.

Figure 6A:
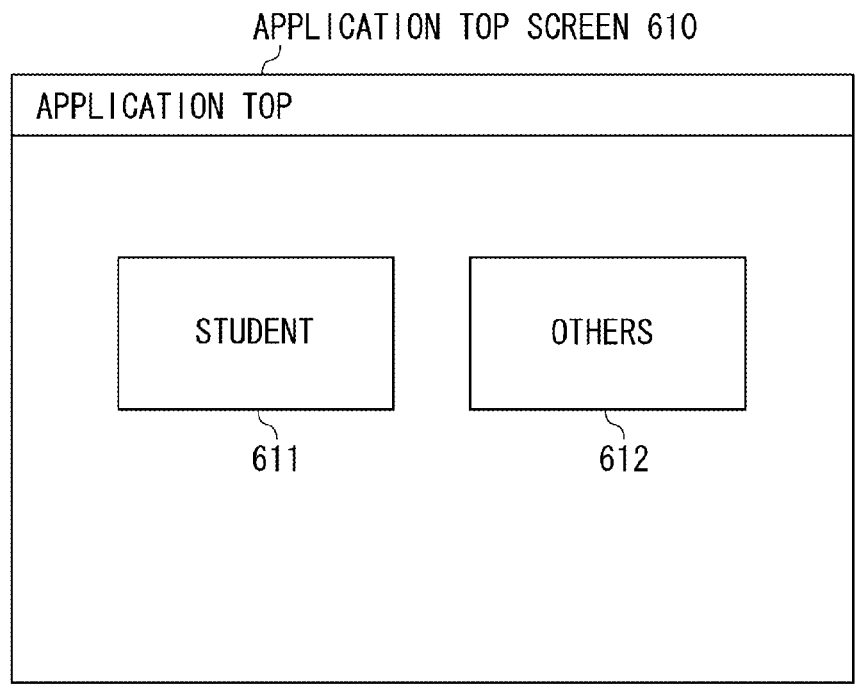
FIGS. 6A and 6B are diagrams illustrating operation screens of the MFP according to an exemplary embodiment.

In step S409, the CPU 211 displays the application top screen 610 illustrated in FIG. 6A on the operation unit 220. A [STUDENT] key 611 and an [OTHERS] key 612 are displayed on the application top screen 610. In the tutoring school support system, a folder named [STUDENT] and a folder named [OTHERS] are created directly under the root folder. When the application top screen 610 is displayed, the MFP 101 acquires information on the folders located directly under the root folder from the file server 102. The MFP 101 displays the [STUDENT] key 611 and the [OTHERS] key 612 based on the information.

The [STUDENT] key 611 is pressed to upload, to the file server 102, a document related to each student enrolled in the tutoring school while the [OTHERS] key 612 is pressed to upload other documents to the file server 102.

Figure 6B:
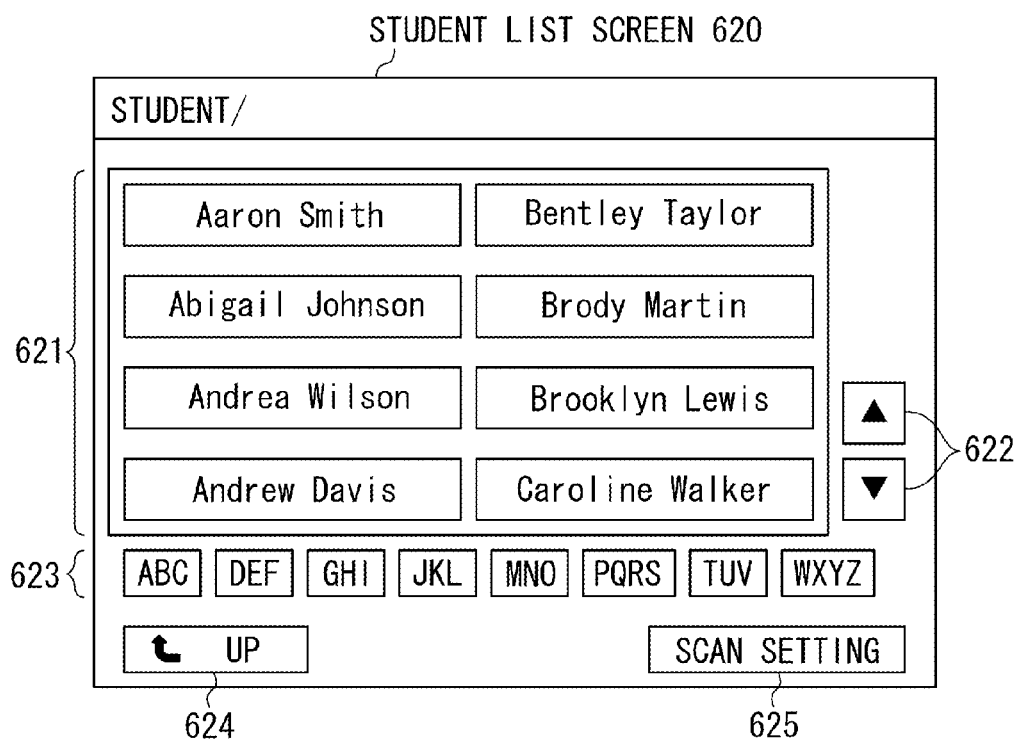

When the [STUDENT] key 611 is pressed, a student list screen 620 illustrated in FIG. 6B is displayed on the operation unit 220. A list of names of students registered in the tutoring school support system is displayed in an area 621. Sub folders are created for the number of students directly under the folder [STUDENT]. The folder name of each sub folder is the name of a corresponding student. When the student list screen 620 is displayed, the MFP 101 acquires information on folders located directly under the folder [STUDENT] from the file server 102, and displays the area 621 based on the information. The folder of each student can be newly created or deleted according to an operation performed on a PC (not illustrated). The MFP 101 displays the folders of the respective students in alphabetical order.

Scroll keys 622 are operation keys for displaying, in the area 621, the names of the students currently not displayed in the area 621 (for scrolling the screen). An index key group 623 includes operation keys for designating a starting character of the names of the students, so that the corresponding names of the students are displayed in the area 621. An [UP] key 624 is an operation key for displaying folders in the one-level higher hierarchy. Thus, when the [UP] key 624 is pressed, the application top screen 610 is displayed. A [SCAN SETTING] key 625 is an operation key for displaying a scan setting screen 900 described below. When the scan setting screen 900 is displayed by using the [SCAN SETTING] key 625, the image data generated by the scanner 222 is stored in the folder [STUDENT]. In a case where storage of image data in the folder [STUDENT] is not to be permitted, the student list screen 620 may be displayed with the [SCAN SETTING] key 625 being omitted.

Figure 7A:
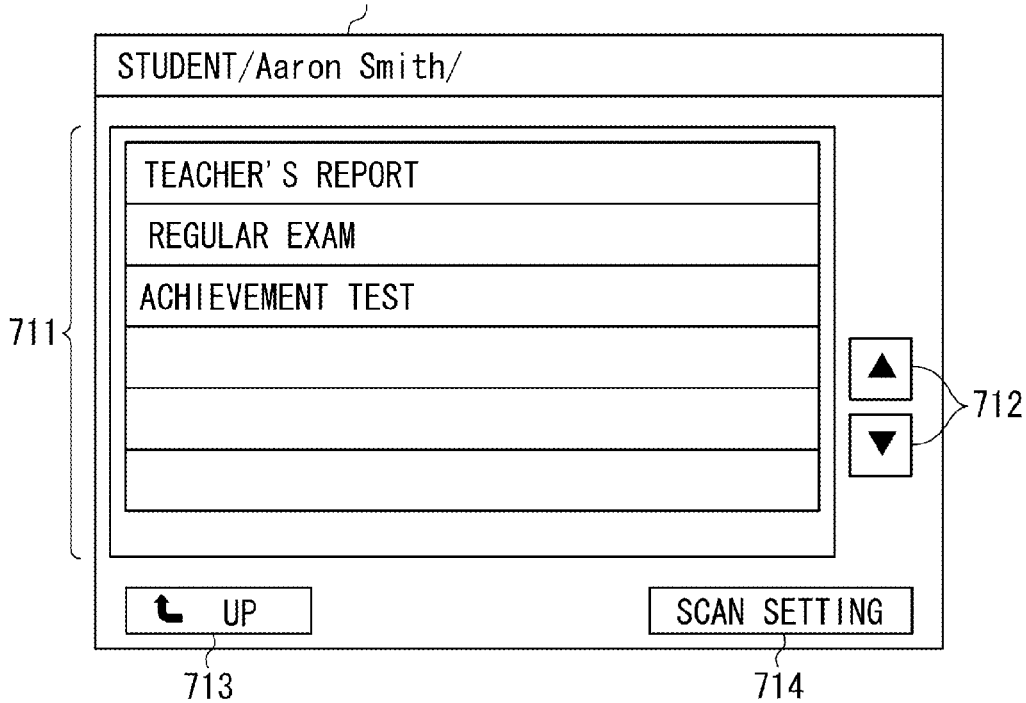
FIGS. 7A and 7B are diagrams illustrating operation screens of the MFP according to an exemplary embodiment.

When any of the operations keys included in the area 621 is pressed, a document type list screen 710 illustrated in FIG. 7A is displayed. FIG. 7A illustrates a case where a student named [Aaron Smith] (a folder named [Aaron Smith]) is selected. In an area 711, a list of document types registered in the tutoring school support system is displayed. Three sub folders, each having a name of the document type set as a folder name, are created directly under the folder [Aaron Smith]. The similar folders are created directly under the folders of other students.

When the document type list screen 710 is displayed, the MFP 101 acquires information on the folders located directly under the folder [Aaron Smith] from the file server 102, and displays the area 711 based on the information. The folder of each document type can be newly created or deleted according to an operation performed on a PC (not illustrated).

Scroll keys 712 are operation keys for displaying, in the area 711, document types currently not displayed in the area 711 (for scrolling the screen). In the example illustrated in FIG. 7A, since only three folders are created directly under the folder [Aaron Smith], all the folders are displayed on the document type list screen 710 illustrated in FIG. 7A. If there are seven or more folders, all the folders cannot be displayed at once. In such a case, the scroll keys 712 are used. An index key group, as displayed on the student list screen 620, is not displayed on the document type list screen 710. An [UP] key 713 is an operation key for displaying folders in the one-level higher hierarchy. Thus, when the [UP] key 713 is pressed, the student list screen 620 is displayed. A [SCAN SETTING] key 714 is an operation key for displaying the scan setting screen 900 described below. When the scan setting screen 900 is displayed by using the [SCAN SETTING] key 714, the image data generated by the scanner 222 is stored in the folder [Aaron Smith].

Figure 7B:
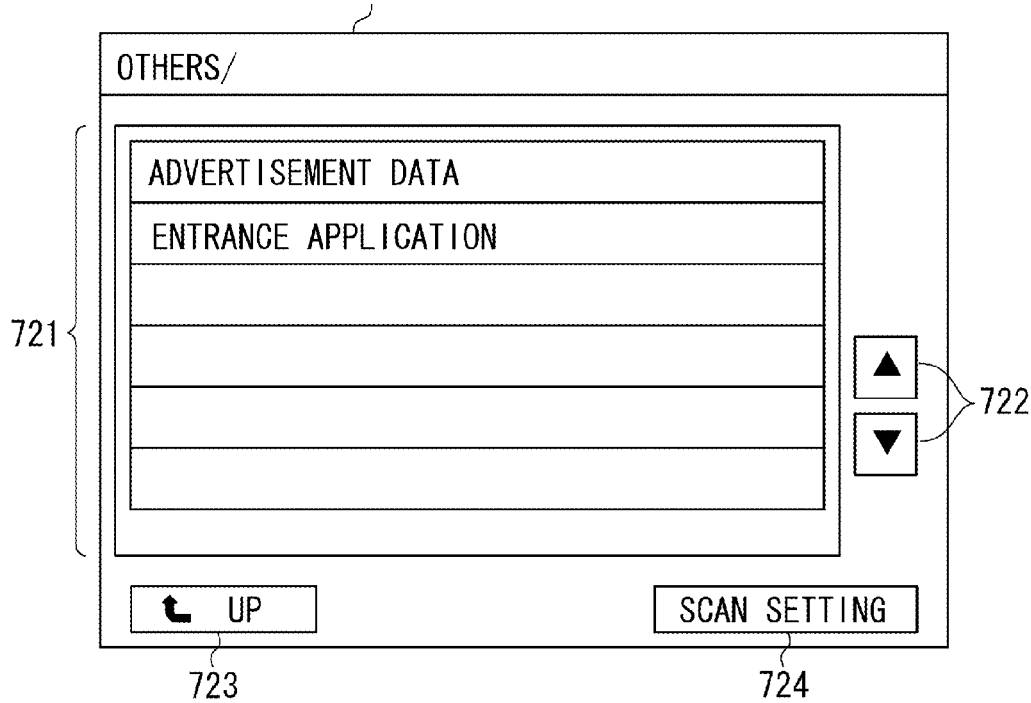

When the [OTHERS] key 612 is pressed on the application top screen 610 illustrated in FIG. 6A, a document type list screen 720 illustrated in FIG. 7B is displayed. In an area 721, a list of document types registered in the tutoring school support system is displayed. Two sub folders, each having a name of the document type set as a folder name, are created directly under the folder [OTHERS]. When the document type list screen 720 is displayed, the MFP 101 acquires information on the folders located directly under the folder [OTHERS] from the file server 102, and displays the area 721 based on the information. The folder of each document type can be newly created or deleted according to an operation performed on a PC (not illustrated).

Scroll keys 722 are operation keys for displaying, in the area 721, document types currently not displayed in the area 721 (for scrolling the screen). In the example illustrated in FIG. 7B, since only two folders are created directly under the folder [OTHERS], all the folders are displayed on the document type list screen 720 illustrated in FIG. 7B. If there are seven or more folders, all the folders cannot be displayed at once. In such a case, the scroll keys 722 are used. An index key group, as displayed on the student list screen 620, is not displayed on the document type list screen 720. An [UP] key 723 is an operation key for displaying folders in the one-level higher hierarchy. Thus, when the [UP] key 723 is pressed, the application top screen 610 is displayed. A [SCAN SETTING] key 724 is an operation key for displaying the scan setting screen 900 described below. When the scan setting screen 900 is displayed by using the [SCAN SETTING] key 724, the image data generated by the scanner 222 is stored in the folder [OTHERS].

When the user selects any of the folders of the document types illustrated in FIGS. 7A and 7B, the content of the selected folder is not displayed, but the scan setting screen 900 described below is displayed. This is because the folders of the document types illustrated in FIGS. 7A and 7B include no sub folders. There are no sub folders because, in the tutoring school support system described herein, the creation of the sub folders in the folders of the document types illustrated in FIGS. 7A and 7B is restricted. However, if the creation of the subfolders is permitted and the sub folders are created, the list of sub folders is displayed in response to the folder of the document type being selected.

Figure 8:
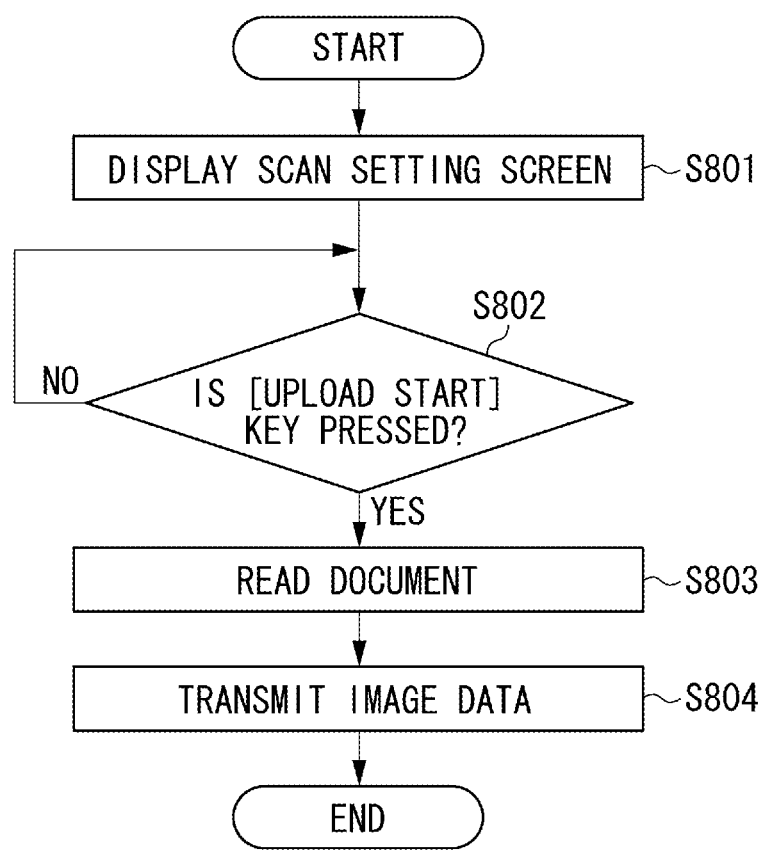
FIG. 8 is a flowchart illustrating processing performed by the MFP according to an exemplary embodiment.

FIG. 8 is a flowchart illustrating processing performed from when the scan setting screen 900 is displayed to when the image data is transmitted to the file server 102. The processing illustrated in the flowchart of FIG. 8 starts when any one of the [SCAN SETTING] keys 625, 714, and 724 is selected or when any one of the folders displayed in the areas 711 and 712 is selected. Each operation (step) in the flowchart of FIG. 8 is implemented by the CPU 211 of the MFP 101 executing a control program stored in the HDD 214.

Figure 9:
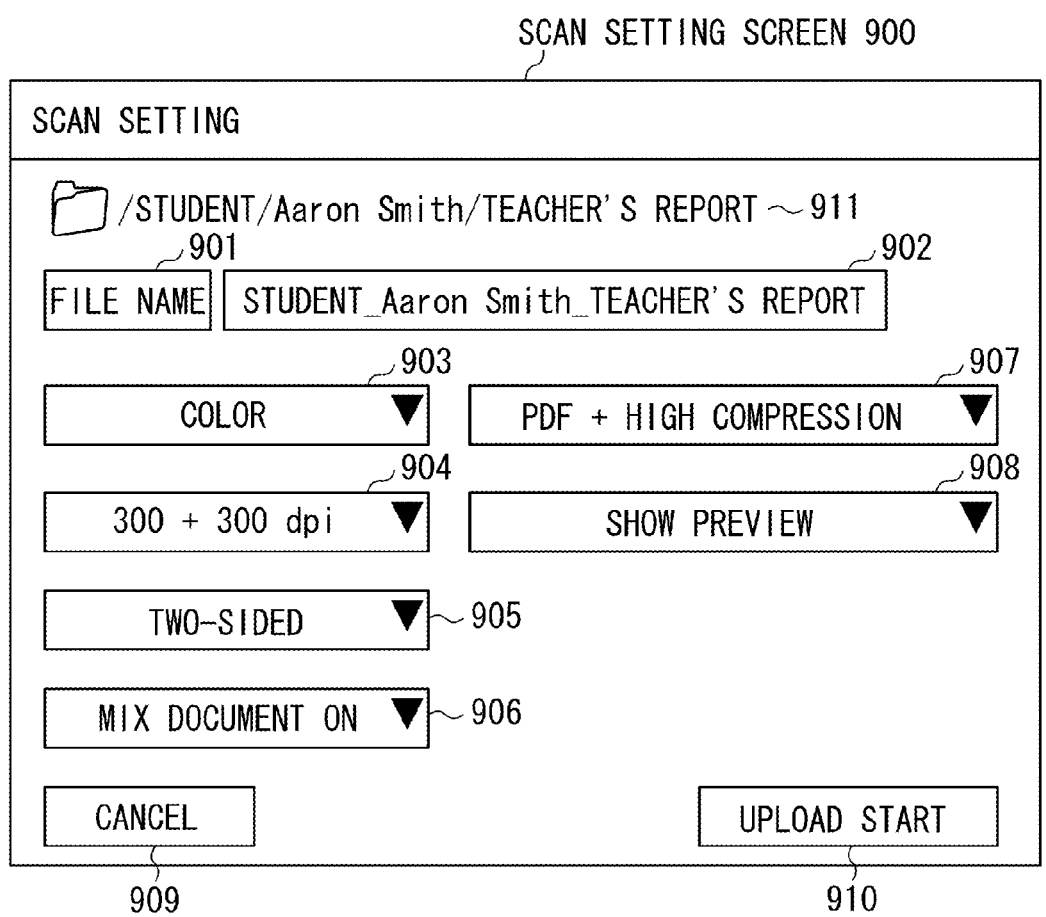
FIG. 9 is a diagram illustrating an operation screen of the MFP according to an exemplary embodiment.

In step S801, the CPU 211 displays the scan setting screen 900 illustrated in FIG. 9. FIG. 9 illustrates a case where a folder named [TEACHER'S REPORT] located directly under the student named [Aaron Smith] (the folder named [Aaron Smith]) is selected. Folder path information indicating a storage destination of the image data generated by the scanner 222 is displayed in an area 911. In the example illustrated in FIG. 9, the image data is stored in the folder [TEACHER'S REPORT].

A [FILE NAME] key 901 is an operation key for setting a file name of the image data. When the [FILE NAME] key 901 is pressed, a software keyboard is displayed, and thus an arbitrary character string to be used as the file name can be input. In an area 902, a file name set as a default is displayed. In the example illustrated in FIG. 9, a character string corresponding to the folder path illustrated in the area 911 is set as the default file name.

Operation keys 903 to 908 are operation keys for setting reading parameters of documents. Reading parameters of other types than those illustrated in FIG. 9 may be added, or some of the reading parameters illustrated in FIG. 9 may be omitted.

The operation key 903 is an operation key for setting a color mode. The user can select a desired color mode from pull-down options [COLOR], [GRAYSCALE], and [BLACK AND WHITE]. The operation key 904 is an operation key for setting a resolution. The user can select a desired resolution from pull-down options such as [300*300 dpi] and [200*200 dpi].

The operation key 905 is an operation key for setting a one-sided reading mode or a two-sided reading mode. The user can select a desired mode from pull-down options [ONE-SIDED] and [TWO-SIDED]. The operation key 906 is an operation key for setting a mixed document mode. The user can select a desired mode from pull-down options [MIX DOCUMENT ON] and [MIX DOCUMENT OFF].

The operation key 907 is an operation key for setting a file format. The user can select a desired file format from pull-down options such as [Tag Image File Format (TIFF)], [Portable Document Format (PDF)], and [PDF+HIGH COMPRESSION]. The operation key 908 is an operation key for setting a preview display mode. The user can select a desired preview display mode from pull-down options [SHOW PREVIEW] and [HIDE PREVIEW].

When a [CANCEL] key 909 is pressed, the scan setting is canceled, and the storage destination can be changed to another folder. When an [UPLOAD START] key 910 is pressed, a document is read and image data is transmitted to the file server 102.

Referring back to FIG. 8, in step S802, the CPU 211 determines whether the [UPLOAD START] key 910 is pressed. If the [UPLOAD START] key 910 is pressed, the processing proceeds to step S803 whereas if the [UPLOAD START] key 910 is not pressed, the CPU 211 stays in step S802 until the [UPLOAD START] key 910 is pressed.

In step S803, the CPU 211 reads the document and generates the image data by the scanner 222 in accordance with the settings performed via the scan setting screen 900. In step S804, the CPU 211 transmits the image data to the file server 102.

Figure 10:
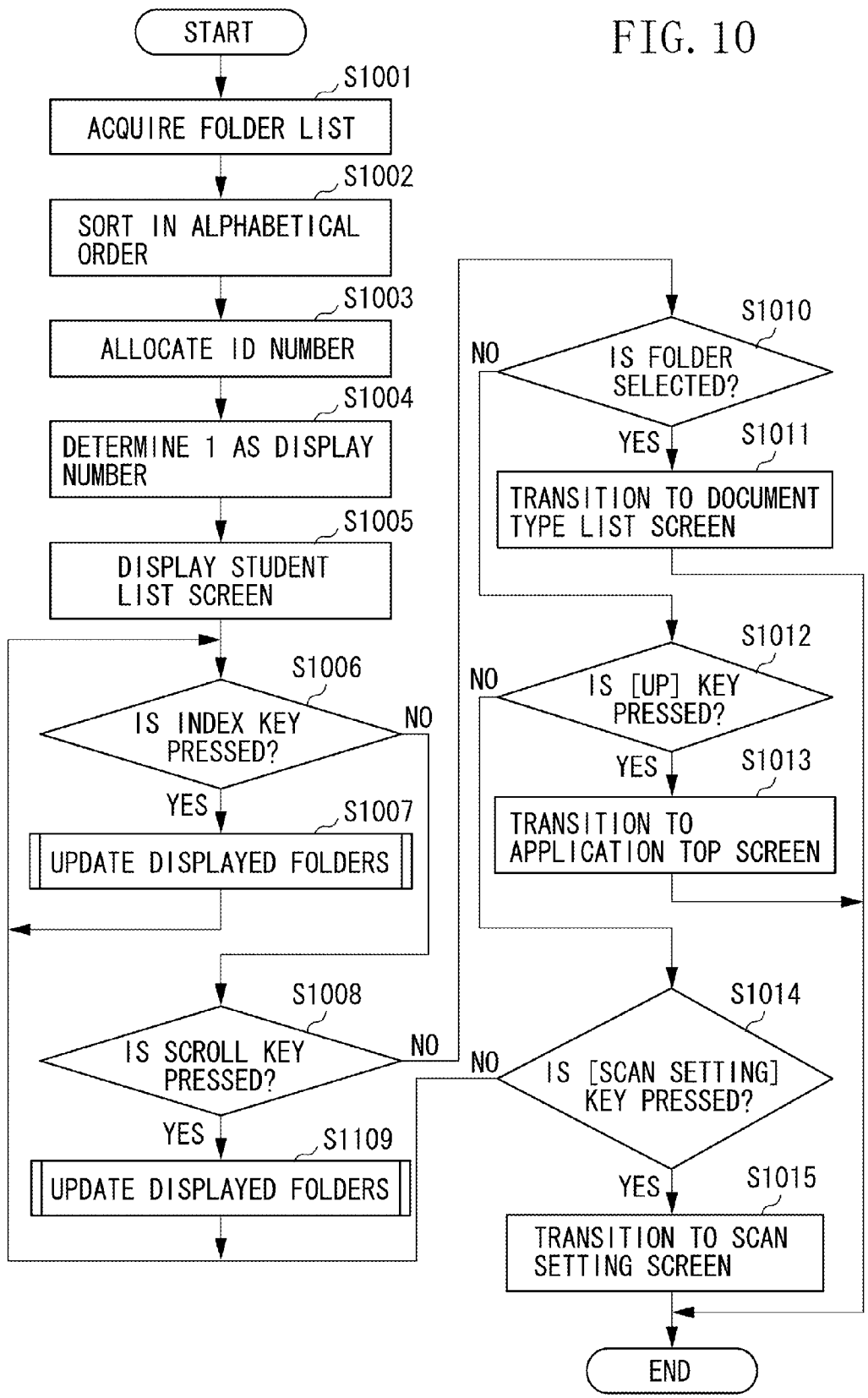
FIG. 10 is a flowchart illustrating processing performed by the MFP according to an exemplary embodiment.

Next, the processing performed for displaying the student list screen 620 illustrated in FIG. 6B and processing performed according to operations performed by the user on the student list screen 620 will be described in detail with reference to the flowchart of FIG. 10. Each operation (step) in the flowchart of FIG. 10 is implemented by the CPU 211 of the MFP 101 executing a control program stored in the HDD 214.

In step S1001, the CPU 211 acquires information on folders located directly under the folder [STUDENT] (a folder list including the names of the folders) from the file server 102. In step S1002, the CPU 211 sorts the acquired names of the folders in alphabetical order. In step S1003, the CPU 211 allocates an ID number (identification information) to each of the folders sorted in alphabetical order.

FIG. 11 illustrates a folder list 1100 which is obtained through the operations up to step S1003. The folders having the student names are sorted in alphabetical order of the student name, and the ID numbers starting from the number 1 are allocated in accordance with this alphabetical order.

In step S1004, [1] is determined as a display number. The display number is a number used as a reference for determining folders to be displayed in the area 621. The folders corresponding to eight ID numbers starting from the ID number determined as the display number are displayed in the area 621. For example, when [1] is determined as the display number, the folders corresponding to ID numbers [1] to [8] are displayed in the area 621. In step S1005, the CPU 211 sequentially extracts the eight folders starting from the folder having the ID number [1], which is determined as the display number in step S1004. Then, the CPU 211 displays the student list screen 620 with the extracted folders being arranged in the area 621. The number of folders that can be displayed at once is eight in this example, but may be a different number depending on the size of the screen.

In step S1006, the CPU 211 determines whether any one of the index keys included in the index key group 623 is pressed. The processing proceeds to step S1007 when the index key is pressed, or proceeds to step S1008 when the index key is not pressed. In step S1007, the CPU 211 performs processing of updating the folders displayed in the area 621. The processing performed in step S1007 will be described in detail below with reference to FIG. 12.

In step S1008, the CPU 211 determines whether either of the scroll keys 622 is pressed. The processing proceeds to step S1009 when either of the scroll keys 622 is pressed, or proceeds to step S1010 when neither of the scroll keys 622 is pressed. In step S1009, the CPU 211 performs the processing of updating the folders displayed in the area 621. The processing in step S1009 will be described in detail below with reference to FIG. 15.

In step S1010, the CPU 211 determines whether any one of the folders displayed in the area 621 is selected. The processing proceeds to step S1011 when any of the folders is selected, or proceeds to step S1012 when none of the folders is selected. In step S1011, the CPU 211 performs the screen transition to the document type list screen 710 illustrated in FIG. 7A.

In step S1012, the CPU 211 determines whether the [UP] key 624 is pressed. The processing proceeds to step S1013 when the [UP] key 624 is pressed, or proceeds to step S1014 when the [UP] key 624 is not pressed. In step S1013, the CPU 211 performs the screen transition from the screen displayed on the operation unit 220 to the application top screen 610 illustrated in FIG. 6A.

In step S1014, the CPU 211 determines whether the [SCAN SETTING] key 625 is pressed. The processing proceeds to step S1015 when the [SCAN SETTING] key 625 is pressed, or returns to step S1006 when the [SCAN SETTING] key 625 is not pressed. In step S1015, the CPU 211 performs the screen transition from the screen displayed on the operation unit 220 to the scan setting screen 900 illustrated in FIG. 9.

Figure 12:
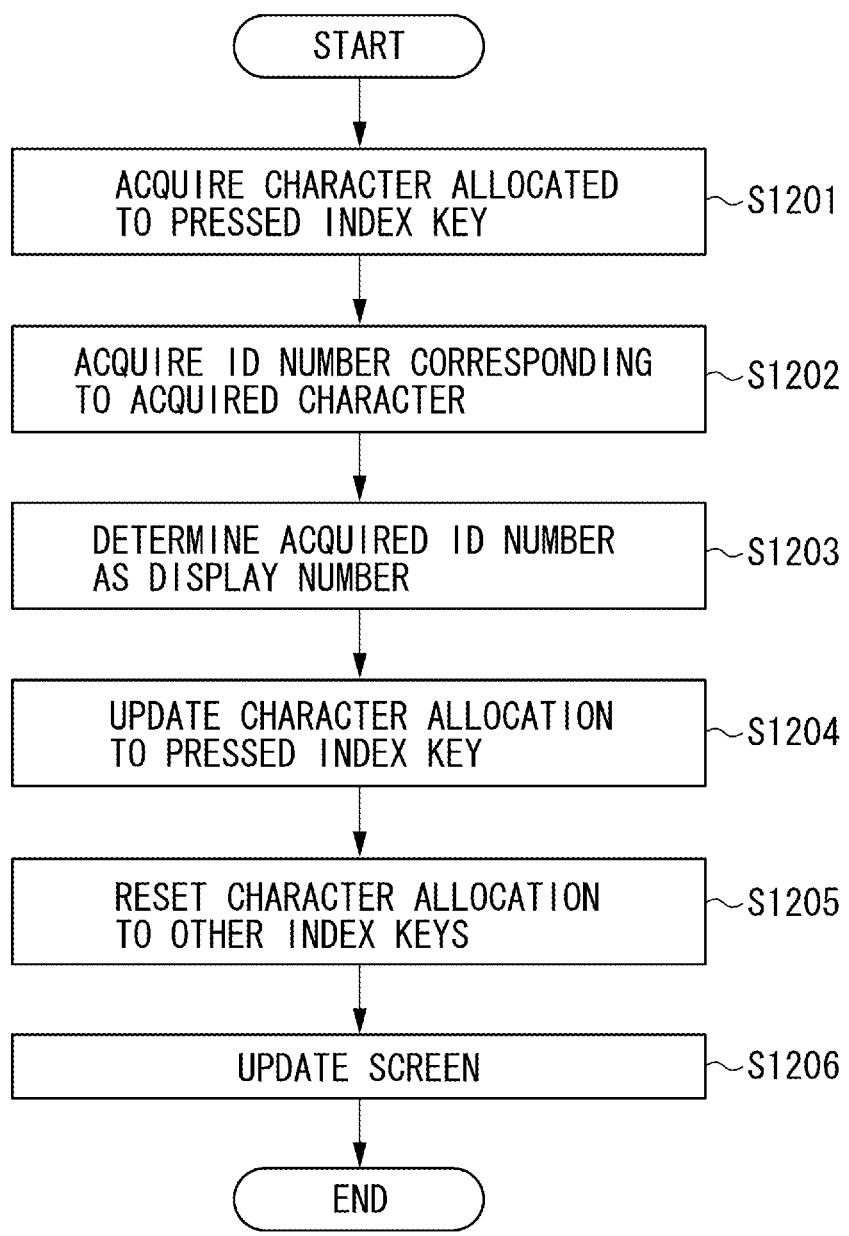
FIG. 12 is a flowchart illustrating processing performed by the MFP according to an exemplary embodiment.

FIG. 12 is a flowchart illustrating the processing performed in step S1007 in FIG. 10 in detail. Each operation (step) illustrated in the flowchart of FIG. 12 is implemented by the CPU 211 of the MFP 101 executing a control program stored in the HDD 214.

Figure 13:
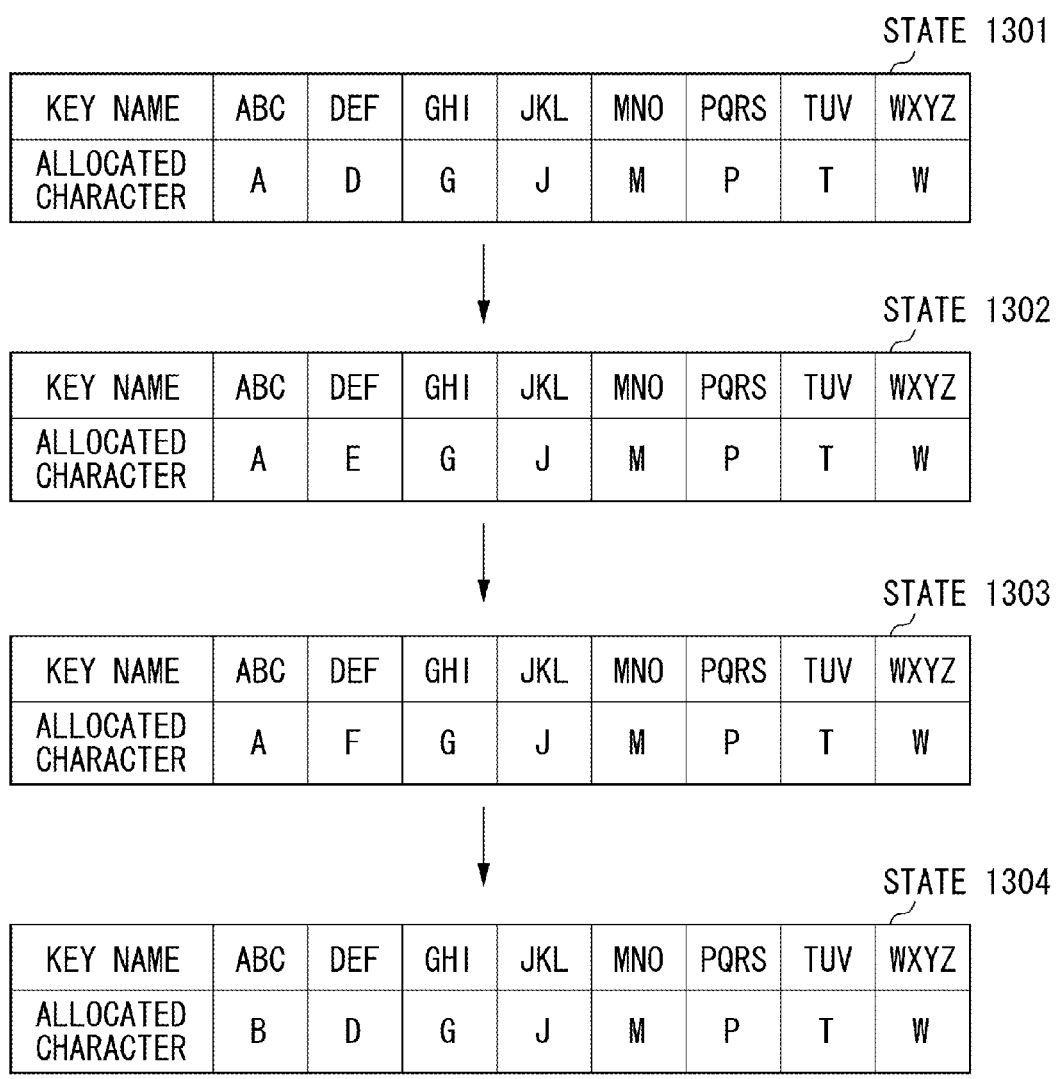
FIG. 13 is a diagram illustrating transition of a character allocation state according to an exemplary embodiment.

In step S1201, the CPU 211 acquires a character allocated to the pressed index key among the index keys included in the index key group 623. The index keys included in the index key group 623 are respectively allocated the characters as illustrated in a state 1301 illustrated in FIG. 13 as initial values. When an index key named [DEF] is pressed in the state 1301, a character [D] is acquired.

In step S1202, the CPU 211 acquires the ID number corresponding to the character acquired in step S1201. Specifically, the CPU 211 identifies the folder names starting from the character acquired in step S1201 from among the folders included in the folder list 1100, and acquires an ID number corresponding to the upper most folder among the identified folders (the folder with the smallest ID number). When the character acquired in step S1201 is [D], a folder [David Sanchez] is identified, and thus an ID number [11] is acquired.

In step S1203, the CPU 211 determines the ID number acquired in step S1202 as the display number. In step S1204, the CPU 211 updates the character allocated to the pressed index key. Specifically, when the [DEF] key to which the character [D] is allocated is pressed, the [DEF] key is then allocated a character [E], which is the character subsequent to [D].

In step S1205, the CPU 211 resets the characters respectively allocated to the index keys other than the pressed index key to the initial state. When the [DEF] key is pressed in the state 1301, the characters allocated to the index keys other than the [DEF] key are already in the initial state, so the allocation to these index keys does not change from the state 1301 to a state 1302.

Figure 14A:
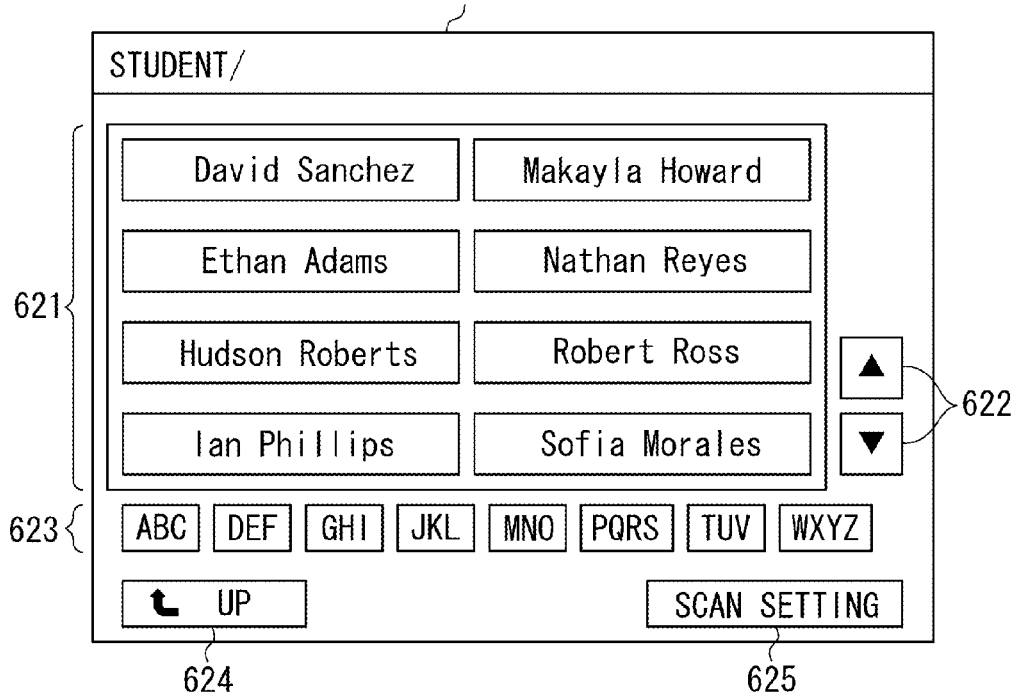
FIGS. 14A and 14B are diagrams illustrating operation screens of the MFP according to an exemplary embodiment.

In step S1206, the CPU 211 sequentially extracts eight folders starting from the ID number determined as the display number in step S1203. The CPU 211 displays the student list screen 620 with the extracted folders arranged in the area 621. The student list screen 620 is thus displayed as illustrated in FIG. 14A. The eight folders starting from the folder [David Sanchez] corresponding to the ID number [11] to a folder [Sofia Morales] corresponding to an ID number [18] are displayed on the screen.

Next, a case where the [DEF] key is pressed again in the state 1302 will be described. In step S1201, the character [E] allocated to the [DEF] key is acquired. In step S1202, the CPU 211 identifies the folder names starting from [E] from among the folders included in the folder list 1100, and acquires an ID number [12] corresponding to a folder [Ethan Adams], which is the upper most folder among the identified folders.

In step S1203, the CPU 211 determines the ID number acquired in step S1202 as the display number. In step S1204, the CPU 211 updates the character allocated to the [DEF] key from [E] to [F]. In step S1205, the CPU 211 resets the characters allocated to the index keys other than the [DEF] key to the initial state. When the [DEF] key is pressed in the state 1302, the characters allocated to the index keys other than the [DEF] key are already in the initial state, so the allocation to these index keys does not change from the state 1302 to a state 1303. As a result, the character allocation to the index keys changes to the allocation illustrated in the state 1303.

Figure 14B:
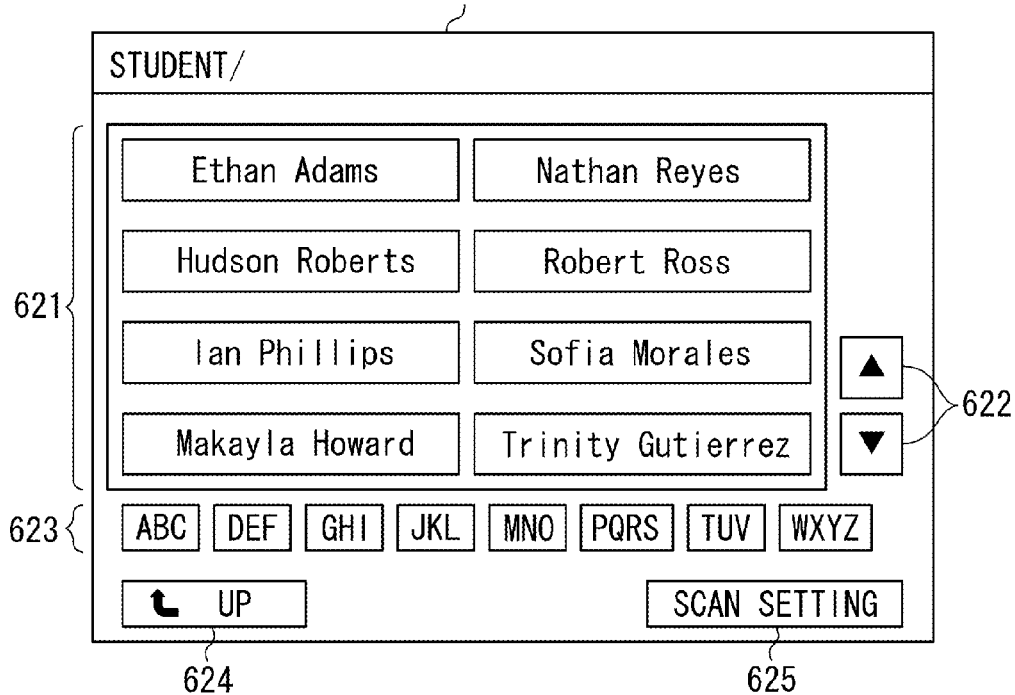

In step S1206, the CPU 211 sequentially extracts eight folders starting from the ID number [12] determined as the display number in step S1203. The CPU 211 then displays the student list screen 620 with the extracted folders arranged in the area 621. The student list screen 620 is thus displayed as illustrated in FIG. 14B. The eight folders starting from the folder [Ethan Adams] corresponding to the ID number [12] to a folder [Trinity Gutierrez] corresponding to an ID number [19] are displayed on the screen.

Next, a case where an [ABC] key is pressed in the state 1303 will be described. In step S1201, the CPU 211 acquires a character [A] allocated to the [ABC] key. In step S1202, the CPU 211 identifies the folder names starting from [A] from among the folders included in the folder list 1100, and acquires the ID number [1] corresponding to the folder [Aaron Smith], which is the upper most folder among the identified folders.

In step S1203, the CPU 211 determines the ID number acquired in step S1202 as the display number. In step S1204, the CPU 211 updates the character allocated to the [ABC] key from [A] to [B]. In step S1205, the CPU 211 resets the characters allocated to the index keys other than the [ABC] key to the initial state. When the [ABC] key is pressed in the state 1303, because the character [F] is allocated to the [DEF] key, processing of returning the allocated character [F] to [D] as in the initial state is performed. As a result, the character allocation to the index keys changes to the allocation illustrated in a state 1304.

In step S1206, the CPU 211 sequentially extracts eight folders starting from the ID number [1] determined as the display number in step S1203. The CPU 211 then displays the student list screen 620 with the extracted folders arranged in the area 621. The student list screen 620 is thus displayed as illustrated in FIG. 6B. The eight folders starting from the folder [Aaron Smith] corresponding to the ID number [1] to a folder [Caroline Walker] corresponding to the ID number [8] are displayed on the screen.

Figure 15:
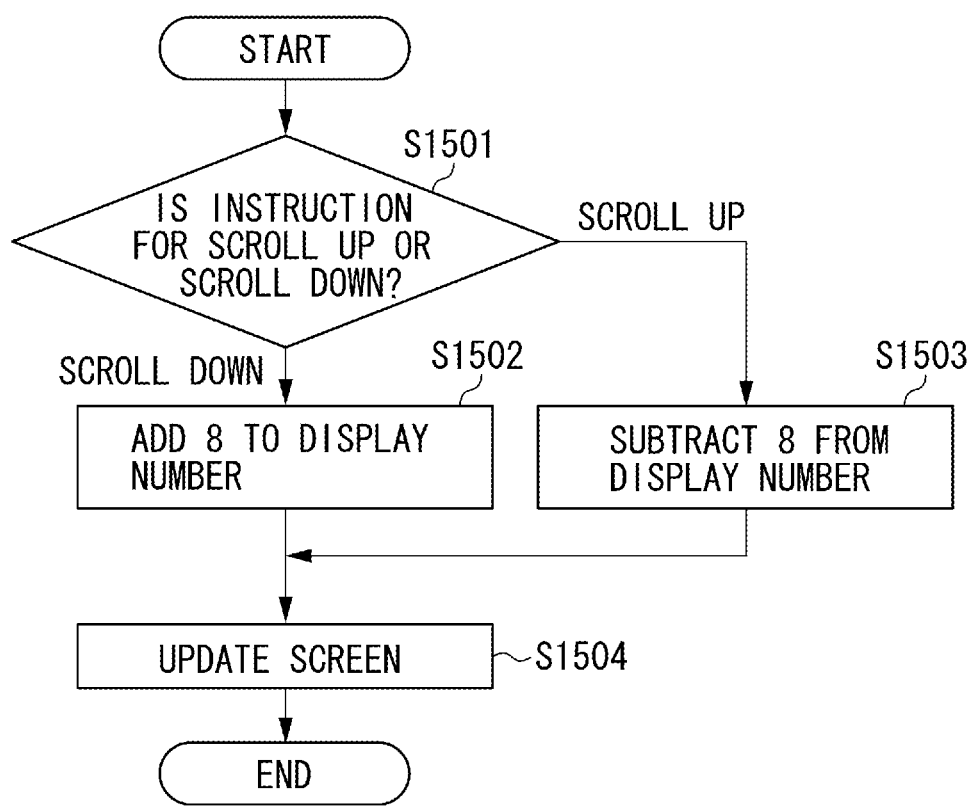
FIG. 15 is a flowchart illustrating processing performed by the MFP according to an exemplary embodiment.

FIG. 15 is a flowchart illustrating the processing performed in step S1009 in FIG. 10 in detail. Each operation (step) illustrated in the flowchart of FIG. 15 is implemented by the CPU 211 of the MFP 101 executing a control program stored in the HDD 214.

In step S1501, the CPU 211 determines the content of an instruction issued by using the scroll keys 622. When a scroll key 622 pointing downward is operated, the CPU 211 determines that an instruction for scroll down is issued, and thus the processing proceeds to step S1502. When a scroll key 622 pointing upward is operated, the CPU 211 determines that an instruction for scroll up is issued, and thus the processing proceeds to step S1503.

In step S1502, a value obtained by adding eight to the value of the display number determined in step S1004 or S1203 is newly determined as the display number. In this example, the added number is eight because the number of folders that can be displayed at once is eight, but the number to be added may be a different number.

In step S1503, a value obtained by subtracting eight from the value of the display number determined in step S1004 or S1203 is newly determined as the display number. In this example, the subtracted number is eight because the number of folders that can be displayed at once is eight, but the number to be subtracted may be a different number. If a value obtained by subtracting eight becomes a number smaller than one, [1] is determined as the display number.

In step S1504, the CPU 211 sequentially extracts eight folders starting from a folder corresponding to the ID number determined as the display number in step S1502 or S1503, and displays the student list screen 620 with the extracted folders arranged in the area 621.

Next, a second exemplary embodiment will be described. The second exemplary embodiment has a similar configuration to the one described in the first exemplary embodiment except that the names of folders (that is, the names of students) located directly under the folder [STUDENT] are written in Japanese, and thus Japanese characters are allocated to index keys.

Figure 16A:
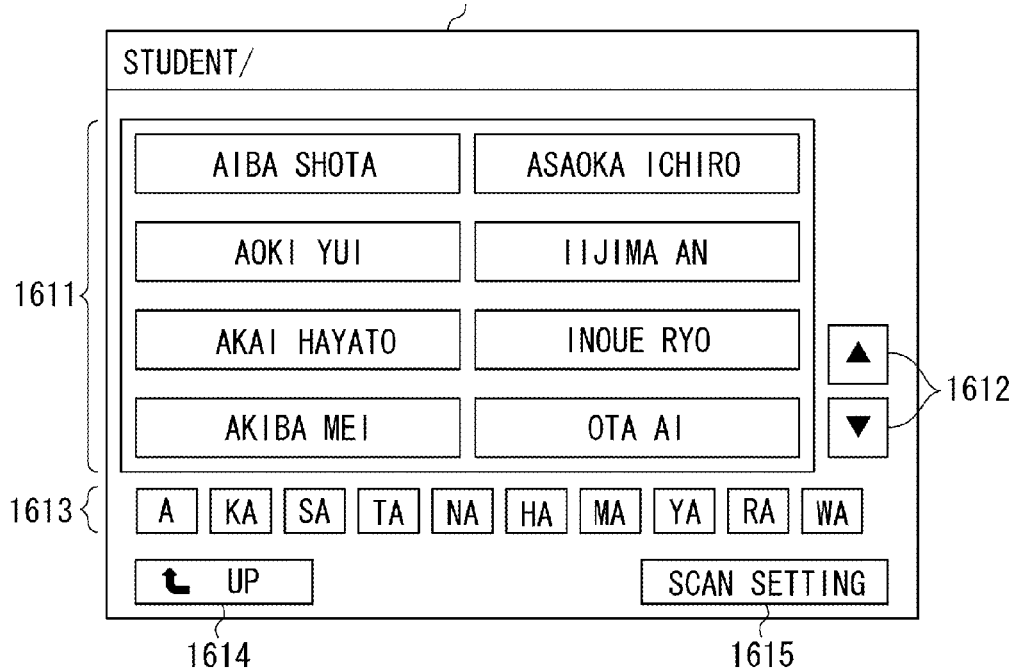
FIGS. 16A and 16B are diagrams illustrating operation screens of an MFP according to an exemplary embodiment.

FIG. 16A illustrates a student list screen 1610 displayed instead of the screen illustrated in FIG. 6B. A list of names of students registered in the tutoring school support system is displayed in an area 1611. Sub folders are created for the number of students directly under the folder [STUDENT]. The folder name of each sub folder is the name of a corresponding student. When the student list screen 1610 is displayed, the MFP 101 acquires information on folders located directly under the folder [STUDENT] from the file server 102, and displays the area 1611 based on the information. The MFP 101 displays the folders of the respective students in Japanese alphabetical order.

Scroll keys 1612 are operation keys for displaying, in the area 1611, the names of the students currently not displayed in the area 1611 (for scrolling the screen). An index key group 1613 includes operation keys for designating a starting character of the names of the students, so that the corresponding names of the students are displayed in the area 1611. An [UP] key 1614 is an operation key for displaying folders in the one-level higher hierarchy. Thus, when the [UP] key 1614 is pressed, the application top screen 610 is displayed. A [SCAN SETTING] key 1615 is an operation key for displaying the scan setting screen 900. When the scan setting screen 900 is displayed by using the [SCAN SETTING] key 1615, the image data generated by the scanner 222 is stored in the folder [STUDENT]. When any of the operations keys included in the area 1611 is pressed, the document type list screen 710 illustrated in FIG. 7A is displayed.

The display of the student list screen 1610 illustrated in FIG. 16A and the update of the screen, which is performed in response to any of the index key group 1613 and the scroll keys 1612 being operated, are performed in accordance with the flowcharts in FIGS. 10, 12, and 15. In the first exemplary embodiment, the character allocated to the [ABC] key is updated from [A] to [B] or from [B] to [C], each time the key is operated. On the other hand, in the second exemplary embodiment, a character allocated to a Japanese character [A] key is updated from [A] to [I], from [I] to [U], from [U] to [E], or from [E] to [O], each time the key is operated.

Figure 16B:
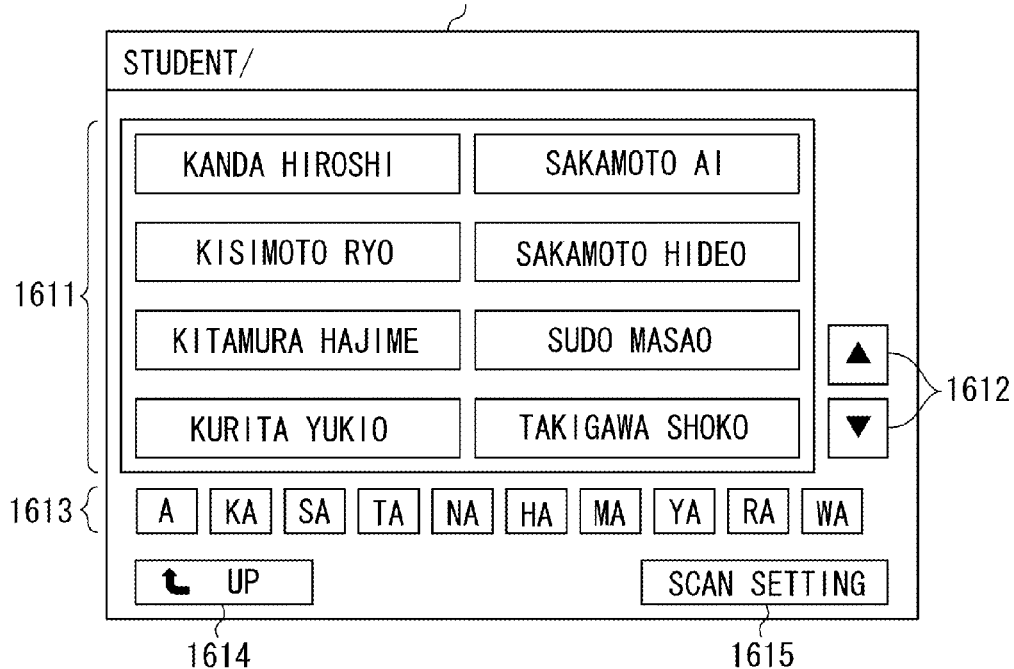

For example, when a Japanese character [KA] key is operated on the student list screen 1610 illustrated in FIG. 16A, eight folders starting from a folder [Kanda Hiroshi] having a folder name starting from the Japanese character [KA] are displayed on a student list screen 1620 illustrated in FIG. 16B. When the [KA] key is operated again, the screen is updated so that eight folders starting from a folder [Kishimoto Ryo] having a folder name starting from a Japanese character [KI], which is a character subsequent to the Japanese character [KA], are displayed.

As described above, the tutoring school support systems according to the first and the second exemplary embodiments include the file server 102 and the MFP 101. The file server 102 manages a plurality of folders. The MFP 101 reads an image on a document to generate image data. The MFP 101 displays a screen including a list of a part of the plurality of folders and an index key. When the index key is operated, the screen is updated so that a folder having a name starting from a first character among the plurality of folders is displayed. When the operated index key is operated again, the screen is updated so that a folder having a name starting from a second character subsequent to the first character among the plurality of folders is displayed. The image data generated by the MFP 101 is stored in the folder selected by the user from among the displayed folders.

With these configurations, higher operability in selection of a folder and efficient use of a screen area can be both achieved.

The above-described configurations are applicable not only to the tutoring school support system, but also to any other environment where a list of folders is displayed.

In the above-described example, folders are managed outside (in the file server 102) a scanner apparatus (the MFP 101). Alternatively, the configurations are applicable to a case where the folders are managed in the scanner apparatus (the MFP 101). In this case, the image data generated by reading a document is stored in a folder in the scanner apparatus (the MFP 101).

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present embodiment has been described with reference to exemplary embodiments, it is to be understood that these exemplary embodiments are not limited to the disclosed exemplary embodiments. The scope of the following claims is to be accorded the broadest interpretation so as to encompass all such modifications and equivalent structures and functions.

This application claims the benefit of Japanese Patent Application No. 2013-193035 filed Sep. 18, 2013, which is hereby incorporated by reference herein in its entirety.

What is claimed is:
1. An image processing system comprising:
at least one processor; and
a memory storing a program including instructions to be executed by the at least one processor to perform a process comprising:
managing, at a management unit, a plurality of folders;

reading, at a reading unit, an image on a document to generate image data;

displaying, at a display unit, a screen including a list of a part of the plurality of folders and an index key;

acquiring, at an acquiring unit, a character allocated to the index key when the index key is operated by a user;

in response to the acquiring unit acquiring a first character allocated to the index key when the index key is operated by the user, updating, at a screen update unit, the list so that a folder having a name starting from the acquired first character from among the plurality of folders is displayed, and further updating the first character allocated to the index key to a second character; and storing, at a storage unit, the generated image data in a folder selected from among folders displayed on the screen, wherein, if the index key operated again after the first character allocated to the index key is updated to the second character by the screen update unit, the screen update unit updates the list so that a folder having a name starting from the second character from among the plurality of folders is displayed.

2. The image processing system according to claim 1, wherein the screen includes a plurality of index keys, and wherein screen update unit further resets character allocation allocated to index keys other than the operated index key to an initial state.

3. The image processing system according to claim 1, wherein the process further comprises:

acquiring, at an acquisition unit, names of the plurality of folders; and allocating, at an allocation unit, identification information to each of the plurality of folders in accordance with an order based on the names acquired by the acquisition unit, wherein the screen update unit determines folders to be displayed on the screen by using the identification information.

4. The image processing system according to claim 1, wherein the management unit is provided in a file server, and wherein the reading unit, the display unit, and the screen update unit are provided in an image processing apparatus configured to communicate with the file server.

5. An image processing apparatus comprising:

at least one processor; and a memory storing a program including instructions to be executed by the at least one processor to perform a process comprising:

displaying a screen including a list of a part of a plurality of folders and an index key;

acquiring, at an acquiring unit, a character allocated to the index key when the index key is operated by a user; and in response to the acquiring unit acquiring a first character allocated to the index key when the index key is operated by the user, updating, the list so that a folder having a name starting from the acquired first character from among the plurality of folders is displayed, and further updating the first character allocated to the index key to a second character, wherein, if the index key operated again after the first character allocated to the index key is updated to the second character, the list is updated so that a folder having a name starting from the second character from among the plurality of folders is displayed.

6. The image processing apparatus according to claim 5, wherein the process further comprises managing, at a management unit, the plurality of folders.

7. The image processing apparatus according to claim 5, wherein the process further comprises communicating, at a communication unit, with a file server configured to manage the plurality of folders.

8. The image processing apparatus according to claim 5, wherein the screen includes a plurality of index keys, and wherein the character allocated to index keys other than the operated index key is reset to an initial state.

9. The image processing apparatus according to claim 5, further comprising:

acquiring, at an acquisition unit, names of the plurality of folders; and allocating, at an allocation unit, identification information to each of the plurality of folders in accordance with an order based on the names acquired by the acquisition unit, wherein folders to be displayed on the screen are determined by using the identification information allocated by the allocation unit.

10. An image processing method comprising:

displaying a screen including a list of a part of a plurality of folders and an index key;

acquiring a character allocated to the index key when the index key is operated by a user;

updating, if a first character allocated to the index key is acquired when the index key is operated by the user, the list so that a folder having a name starting from the acquired first character from among the plurality of folders is displayed; and updating, if a first character allocated to the index key is acquired when the index key is operated by the user, the first character allocated to the index key to a second character, wherein, if the index key operated again after the first character allocated to the index key is updated to the second character, the list is updated so that a folder having a name starting from the second character from among the plurality of folders is displayed.

11. A non-transitory computer-readable storage medium storing computer executable instructions for causing a computer to execute steps of:

displaying a screen including a list of a part of a plurality of folders and an index key;

acquiring a character allocated to the index key when the index key is operated by a user;

updating, if a first character allocated to the index key is acquired when the index key is operated by the user, the list so that a folder having a name starting from the acquired first character from among the plurality of folders is displayed; and updating, if a first character allocated to the index key is acquired when the index key is operated by the user, the first character allocated to the index key to a second character, wherein, if the index key operated again after the first character allocated to the index key is updated to the second character, the list is updated so that a folder having a name starting from the second character from among the plurality of folders is displayed.

* * * * *